Aug. 18, 1931.  N. HUBBARD  1,819,243
HOSE CONNECTION
Filed July 2, 1924

INVENTOR
Norman Hubbard
BY
Gifford & Scull
ATTORNEY

Patented Aug. 18, 1931

1,819,243

UNITED STATES PATENT OFFICE

NORMAN HUBBARD, OF ELIZABETH, NEW JERSEY, ASSIGNOR TO THE BABCOCK & WILCOX COMPANY, OF BAYONNE, NEW JERSEY, A CORPORATION OF NEW JERSEY

HOSE CONNECTION

Application filed July 2, 1924. Serial No. 723,620.

Figure 1:
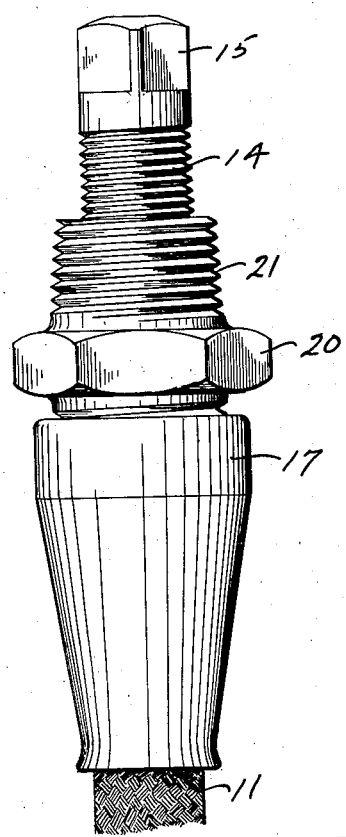
Figure 3:
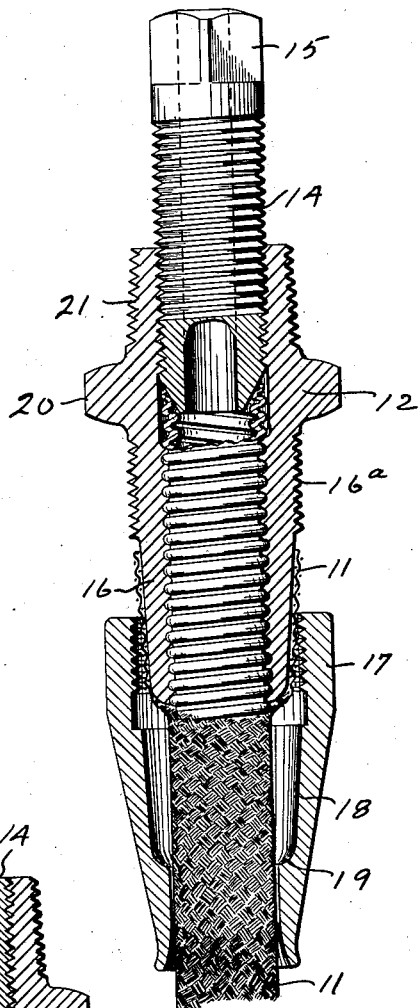
Figure 2:
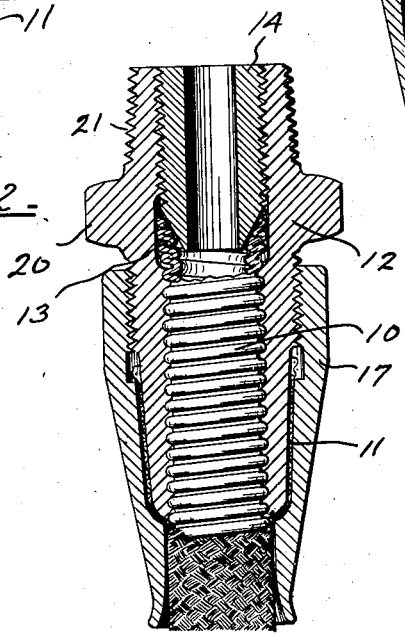

My present invention relates to a hose connection particularly adapted for use with a well-known type of spiral metallic hose having a woven sheath thereon, and will be best understood from the accompanying drawings and the following description of an illustrative embodiment, in which Fig. 1 is an exterior view of a connection embodying my invention; Fig. 2 is a longitudinal section of Fig. 1, and Fig. 3 is a section similar to Fig. 2, but showing the parts in unassembled position to better illustrate the construction.

Like reference characters indicate like parts in the different views.

The spiral metal hose 10 has the sheath 11 removed from the end of the hose, the hose being screwed into a central member 12, the axial opening through the member 12 having one end screw-threaded to engage the threads formed by the spirals of the hose 10. At the end of this screw-threaded portion of the central member 12 is an enlarged space 13 whose diameter is larger than the tops of the threads engaging the metallic hose 10. At the opposite end of the central member 12, the axial opening is screw-threaded, and into this threaded portion is screwed a sealing member 14, having an axial opening and having its inner end tapered so as to extend inside the metallic hose 10 to expand the same outwardly into the opening 13, and also to compress the sections of the spiral between the tapered end of the member 14 and the screw-threaded portion at the bottom of the member 12, as shown best in Fig. 2. The sealing member 14 is preferably provided with a square end 15, by which it may be screwed into place and, if desired, the end of the sealing member 14 may be cut off level with the end of the central member 12, as shown in Fig. 2.

By the arrangement shown, the metallic hose 10 is held against longitudinal motion relative to the central member 12 by its screw-threaded engagement therewith and the end of the hose is sealed by the pressure between the tapered end of the member 14 and the walls of the opening 13, it being obvious that by screwing down the member 14, the spirals of the hose 10 will be collapsed and compressed within the opening 13 when ordinary pressure may be desired, so as to prevent leakage. The jamming of the ends of the hose 10 in the manner shown in order to produce the sealing also serves to lock the hose against endwise motion relative to the central member 12 and thus assist the threaded portion of the central member 12 in holding the hose 10. I thus secure a metal-to-metal joint which is effective without resort to packing or welding.

In order to further insure a permanent connection between the central member 12 and the hose, I preferably provide a tapered portion 16 on the exterior of the central member 12 and draw the sheath 11 over this tapered portion, the lower end of which is rather abruptly turned inward, as illustrated. Screw-threads 16$^a$, also on the exterior of the central member 12, are engaged by the screw-threads of a sheath clamping member 17, so that the sheath 11 is clamped between the tapered internal face 18 of the member 17, this tapered surface 18 terminating rather abruptly in an inwardly turned face 19 arranged to press the sheath against the corresponding end of the central member 12. As shown in Fig. 2, when the member 17 is drawn into place, the sheath 11 will be squeezed between the tapered surface of the member 17 and the central member 12 and will also be held by the endwise pressure between the surface 19 and the lower end of the central member 12, so that the sheath will be tightly gripped to the central member and thus assist in resisting the longitudinal pressure tending to separate the central member 12 from the hose. In the form illustrated, the central member 12 is provided with a portion 20 with faces to receive a wrench, by which the central member 12, after the hose is attached to it, may be turned to screw the screw-threads 21 on the spud forming the end of the central member 12 into the part to which the hose is to be connected. Preferably the exterior of the member 17 is made round, so that when a wrench is used on the portion 20 to detach the coupling from a pipe fitting, there is no liability of the workman engaging the member 17 to unscrew it from the threads 16ª.

It will be understood that the form which I have illustrated is merely my preferred embodiment of my invention and that the embodiment of my invention may be widely varied and that certain features of my invention may be used independently of other features.

I claim:

1. An end connection for sheathed spiral metallic hose, comprising a central member having a threaded central opening into which the spiral metallic hose is screwed and a larger interior opening at the end of the threaded opening, a screw threaded sealing member screwed into the central member and adapted to be forced into the interior of the end of the metallic hose and to expand it into said larger opening and to hold the walls of the end of the metallic hose against the walls of said larger opening, and means to bind the end of the sheath to the exterior of said central member.

2. An end connection for sheathed spiral metallic hose, comprising a central member having a threaded central opening into which the spiral metallic hose is screwed and a larger interior opening at the end of the threaded opening, a screw threaded sealing member screwed into the central member and adapted to be forced into the interior of the end of the metallic hose and to expand it into said larger opening and to hold the walls of the end of the metallic hose against the walls of said larger opening, said central member having a portion of its exterior tapered, and a sheath clamping member having a screw-threaded engagement with the exterior of the central member and a tapered interior opening adapted to bind the sheath between the tapered portion of the clamping member and the tapered portion of the central member.

3. An end connection for sheathed spiral metallic hose, comprising a central member having a threaded central opening into which the spiral metallic hose is screwed and a larger interior opening at the end of the threaded opening, a sealing member connected to the central member and adapted to be forced into the interior of the end of the metallic hose and to expand it into said larger opening and to hold the walls of the end of the metallic hose against the walls of said larger opening, said central member having a portion of its exterior tapered, and a sheath clamping member having a screw-thread engagement with the exterior of the central member and a tapered interior opening adapted to bind the sheath between the tapered portion of the clamping member and the tapered portion of the central member, the tapered interior opening of the clamping member having an abrupt termination arranged to bend the sheath relatively sharply and bind it against the end of the central member.

4. An end connection for spiral metallic hose, comprising a central member having a threaded longitudinal opening through said member, and an opening of larger diameter intermediate the ends of said threaded opening, said spiral metallic hose being screwed into said threaded opening a sufficient distance to extend into said larger opening, a sealing member screwed into said threaded opening opposite the end into which said hose is screwed, said sealing member also extending into said larger opening and having a tapered end entering the end of said hose and expanding it against the inner walls of said larger opening.

5. An end connection for sheathed spiral metallic hose, comprising a central member having a threaded longitudinal opening therethrough and an opening of larger diameter intermediate the ends of said threaded opening, said spiral metallic hose being screwed into said threaded opening a sufficient distance to extend into said larger opening, a sealing member screwed into said threaded opening opposite the end into which said hose is screwed, said sealing member also extending into said larger opening and having a tapered end entering the end of said hose and expanding it against the inner walls of said larger opening, the sheath of said hose extending onto the exterior of said central member, and a clamping member having screw threaded engagement with the exterior of said central member.

6. An end connection for spiral metallic hose, comprising a member having a threaded longitudinal opening therethrough, the threads on said opening being adapted to receive the spirals of a hose, means on said member for connecting it to another fitting, a sealing member threaded into said opening and adapted to expand said hose to lock it to said member, said sealing member having an axial opening therethrough and cut off flush with the end of said first named member, and wrench faces formed on said first named member.

NORMAN HUBBARD.